United States Patent
Prengaman et al.

(10) Patent No.: US 6,177,056 B1
(45) Date of Patent: Jan. 23, 2001

(54) PROCESS FOR RECYCLING LEAD-ACID BATTERIES

(75) Inventors: R. David Prengaman; Clifford E. Morgan, both of Arlington; Homer P. Hine, Colleyville, all of TX (US); Gerald M. Griffin, Jr., Roscoe, NY (US)

(73) Assignee: RSR Corporation, Dallas, TX (US)

(*) Notice: Under 35 U.S.C. 154(b), the term of this patent shall be extended for 0 days.

(21) Appl. No.: 09/229,533

(22) Filed: Jan. 13, 1999

(51) Int. Cl.[7] .............................. C01D 5/00; C22B 1/00; C22B 26/10; C01B 17/22
(52) U.S. Cl. .................... 423/199; 423/540; 423/243.08; 75/696; 241/24.11; 241/24.13
(58) Field of Search ...................... 423/539, 540, 423/243.08, 243.09, 243.1, 551, 92, 199; 23/302 R, 302 T; 75/696; 241/24.11, 24.13, 24.17, 24.18

(56) References Cited

U.S. PATENT DOCUMENTS

| | | | |
|---|---|---|---|
| 3,607,141 | * 9/1971 | Montagna et al. | 23/302 A |
| 3,932,586 | * 1/1976 | Guerrieri | 423/243.08 |
| 3,944,650 | * 3/1976 | Hirota et al. | 423/551 |
| 4,030,916 | * 6/1977 | Liniger | 75/77 |
| 4,118,219 | * 10/1978 | Elmore et al. | 423/92 |
| 4,147,756 | * 4/1979 | Dahlstrom et al. | 423/243.09 |
| 4,211,557 | * 7/1980 | Sychev et al. | 75/77 |
| 4,652,381 | * 3/1987 | Inglis | 423/92 |
| 4,769,116 | * 9/1988 | Olper et al. | 423/98 |
| 5,248,342 | * 9/1993 | Montgomery et al. | 423/92 |
| 5,467,365 | * 11/1995 | Bied-Charreton et al. | 373/9 |

* cited by examiner

Primary Examiner—Steven Bos
(74) Attorney, Agent, or Firm—Theresa M. Gillis

(57) ABSTRACT

A process for recovery of substantially all the sulfur in a spent lead-acid battery as $Na_2SO_4$ is disclosed. The process comprises (a) breaking the batteries to remove the acid, (b) separating the plastic from the lead bearing materials, (c) smelting the lead bearing materials in a reverberatory furnace in an oxidizing atmosphere to volatilize most of the sulfur in the feed as $SO_2$, (d) scrubbing the $SO_2$ from the off gas stream using a soluble alkaline material such as NaOH, $Na_2CO_3$, or KOH to produce a soluble sulfite solution, (e) oxidizing the sulfite solution to sulfate, preferably by turbulent mixing of the solution with air, (f) adjusting the pH by adding the sulfuric acid separated from the batteries, (g) removing the contained heavy metals, (h) crystallizing the sulfate as $Na_2SO_4$ or $K_2SO_4$, (i) separating a bleed stream from the crystallizer and removing the contained chlorides as a mixed sulfate-chloride product by evaporation of the bleed stream in another crystallizer. The process produces a high grade $Na_2SO_4$ or $K_2SO_4$ product, condensed $H_2O$ for recycle to the scrubber, and a mixed sulfate-chloride product while reducing sulfur dioxide, chloride and heavy metal emissions to extremely low levels.

9 Claims, 1 Drawing Sheet

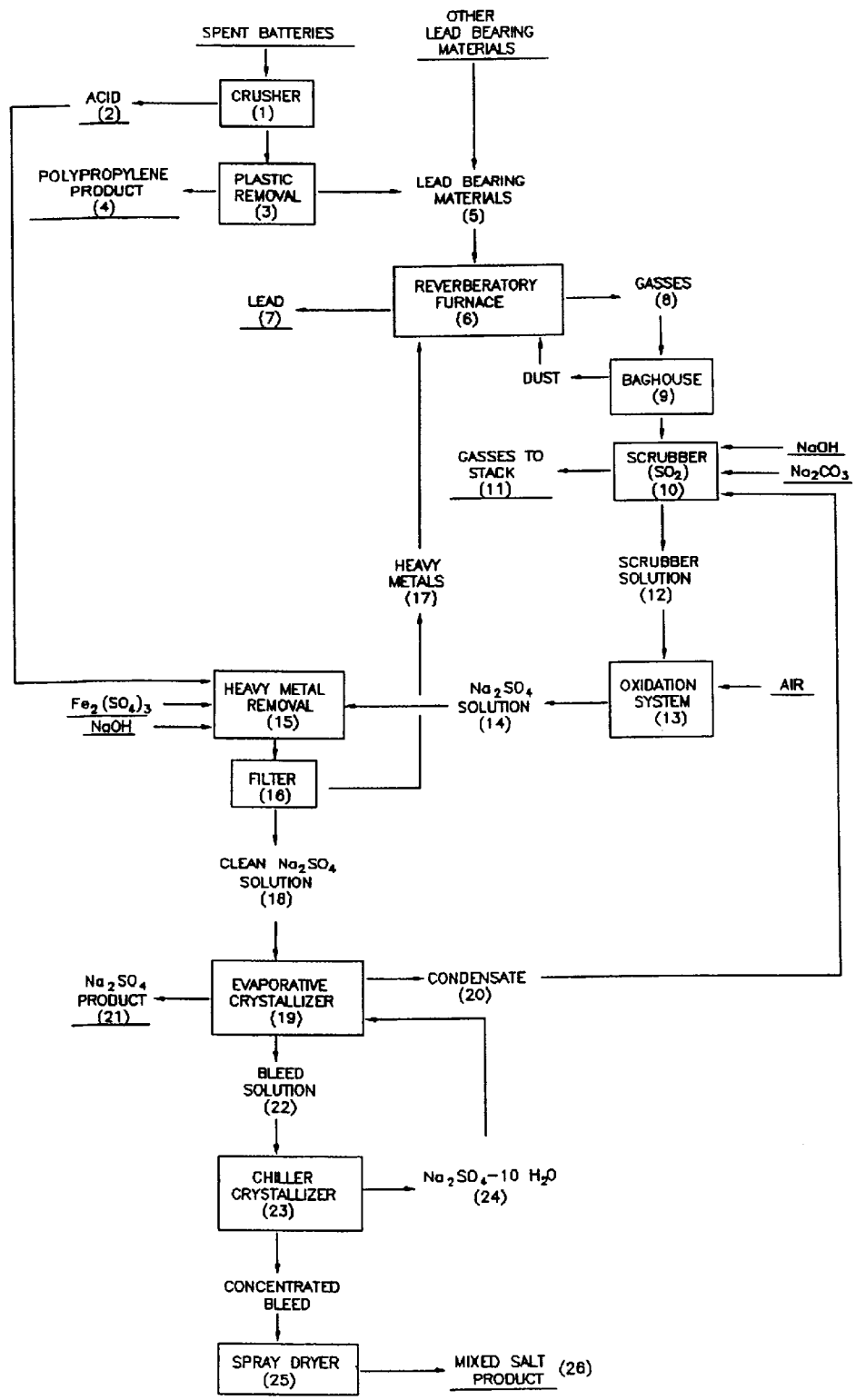
FIGURE I
Process for Improved Recovery of Sulfur
From Lead-acid Battery Scrap

PROCESS FOR RECYCLING LEAD-ACID BATTERIES

BACKGROUND OF THE INVENTION

Recovery of lead from spent batteries is of significant economic importance, both as a source of raw materials and because of the problems of disposal of hazardous wastes. For many years battery recycling plants have attempted to solve the problems associated with the presence of sulfur and chlorides in battery scrap by extensive beneficiation of the spent battery scrap. The batteries were broken, the acid drained, and the remaining material milled to a small size. The crushing and milling liberated most of the paste portion from the grids and crushed the plastic components of the battery.

In a series of hydrometallurgical processing steps the paste was separated from the metallic lead and plastic portions of the battery. Much of the chloride containing plastic along with other non-recyclable plastic, glass, and inorganic components of the battery were separated from the paste and metallics. The material, however, contains a substantial amount of lead as finely divided lead or active material. Despite persistent efforts to remove the lead, sufficient lead remains in this material to prevent disposal in non-regulated landfills.

The standard method of recovering lead values from spent batteries involves smelting the lead bearing portions of the battery in a reverberatory, rotary, blast, or electric furnace using standard pyrometallurgical procedures. These pyrometallurgical processes have several disadvantages or drawbacks.

The main disadvantage of the pyrometallurgical processes is that they operate at elevated temperatures and generate substantial amounts of sulfur dioxide gas as well as volatile dusts. The dusts carry substantial amounts of volatile metals such as lead, arsenic, antimony, cadmium, and the like. The off gases also contain chlorine or chlorides as a result of combustion of chloride containing materials such as separators made of polyvinyl chloride.

With the restrictions of the Clean Air Act, $SO_2$ emissions from industrial smelting facilities must be reduced to very low levels. Spent lead acid batteries contain a substantial amount of sulfur in the form of $H_2SO_4$ from the electrolyte and even more as $PbSO_4$ in the active material as the product of battery discharge. High volume battery recycling plants handle hundreds of tons of scrap batteries per day. The sulfur content of a spent battery is about 3.9% of battery weight and thus a plant could have an input of many tons of sulfur per day.

To control the $SO_2$, rotary furnaces tie up most of the sulfur in the battery scrap as a FeS—$Na_2S$ soda matte, blast furnaces and electric furnaces can tie up the sulfur as a sulfide matte. Reverberatory furnaces can also use iron or sodium compounds to tie up the sulfur in the slag; however, further processing of the reverberatory furnace slag or disposal of the matte or slag may be a problem due to leaching of heavy metals from the soluble components of the slag.

In order to reduce $SO_2$ emissions, the separated paste has been treated with solutions of alkali materials such as NaOH or $Na_2CO_3$ to react with the $PbSO_4$ in the following reactions:

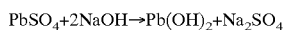
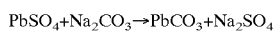

The resultant "desulfurized" material is recovered as a sludge or filter cake. Despite extensive efforts to wash the sludge and to desulfurize with excess alkali reagents, substantial amounts of sulfur often remain in desulfurized paste as unreacted $PbSO_4$ or as $Na_2SO_4$ retained in the material. The sulfur content of the non-desulfurized paste is about 6%, while that of the desulfurized paste normally contains about 1% total sulfur or less.

In addition to the sulfur, the paste often contains a number of small PVC particles which are not liberated in the plastic removal system. When the desulfurized paste and metallics are smelted in furnaces, however, the $SO_2$ content of the gas stream is still at elevated levels, thus requiring the addition of fluxes to tie up the sulfur as a matte or soda matte. With desulfurization, only the quantity of these wastes is decreased.

To assure compliance with regulations restricting the emission of $SO_2$ to low values, battery recycling plants utilizing reverberatory furnaces have installed alkali or lime scrubbers to reduce the amount of $SO_2$ emitted despite the desulfurization of the feed material. Lime scrubbers generate substantial amounts of gypsum as well as $CaSO_3$, while alkali scrubbers generate mixed sulfate-sulfite solutions. In addition to the $SO_2$ the scrubbers also scrub any contained chlorides. The effluent sludge from the lime scrubbers as well as sludge from calcium neutralization of the battery acid is generally sent to landfills.

In processes where the active material (paste) portion of the battery is separated from the metallics and is desulfurized using a solution of ammonia, sodium or potassium hydroxide, carbonate or bicarbonate, lead carbonate or lead hydroxide and relatively pure $Na_2SO_4$, $(NH_4)_2SO_4$, $K_2SO_4$, etc. solutions are produced. These solutions are often crystallized to recover the sulfate salts.

When alkali scrubbers are used to recover sulfur, a discharge solution containing mixed sulfate, bisulfite, thiosulphate, sulfite, and other sulfur species along with chlorides and heavy metals is produced. Because of the chlorides and heavy metals, the scrubber solutions after oxidation to sulfate have not been able to be processed into saleable sulfate products. These alkali sulphate solutions, when cleaned of heavy metals and where the level of total dissolved solids permits, have been discharged as waste water into sanitary sewers.

Where the disposal of high levels of dissolved solids into the waste water is not possible, lime scrubbers have been used to remove the sulfur from the furnace off gases. In these scrubbers the sulfur is trapped as $CaSO_3$, $CaSO_4$, or mixed sulfur compounds. When oxidized to gypsum, the material has low solubility in the scrubbing solution. Because the scrubber products are not soluble, fouling of the scrubber interior is a major problem. In addition, the gypsum produced from scrubbers of battery recycling is a solid waste and may be a hazardous waste depending on the heavy metal content of the material. The gypsum is also produced as a sludge which can restrict disposal.

An additional problem is the chloride which can form soluble $CaCl_2$ and build up in the scrubber solutions. These chloride solutions are very soluble and present problems of high dissolved solids in waste water discharges. An additional problem is small amounts of magnesium in the lime. Magnesium reacts with the $SO_2$ or Cl to form soluble magnesium salts which compound the dissolved solids problem of lime scrubber discharges.

The effluent from alkali scrubbers in general cannot be utilized to produce a sulfate product due to the presence of heavy metals and chlorides scrubbed from the gas stream.

When cleaned of heavy metals the solutions must be disposed of in sewers despite the high salt content. Many municipalities have restricted the total dissolved solids in the plant effluent, thus reducing the ability of the plant to discharge these scrubber solutions.

In contrast to the prior art methods, the method of the present invention assures that greater than 99% of the sulfur in the battery is recovered and the heavy metal content, $SO_2$, and chloride content of the off gases is reduced to negligible values.

SUMMARY OF THE INVENTION

In the practice of the present invention, batteries are crushed to remove the acid and separate the plastic from the lead bearing materials. The lead bearing materials are smelted in an oxidizing atmosphere to volatilize any sulfur present to $SO_2$. The $SO_2$ is retrieved from the gas stream by scrubbing with a soluble alkaline material to produce a soluble sulfite solution which in turn is oxidized to sulfate which is crystallized after heavy metals have been removed from the feed. The bleed stream from the crystallizer may be then subjected to further evaporative crystallization to recover the chlorides as a mixed sulfate-chloride product.

DESCRIPTION OF THE DRAWING

FIG. 1 is a flow diagram of the preferred practice of the present invention.

DETAILED DESCRIPTION OF THE INVENTION

The invention consists of a method of recovering the lead values in lead acid battery scrap or other lead bearing materials without substantial pollution of the air by $SO_2$, chlorides or volatile dusts. The invention also eliminates sulfur containing solid wastes such as gypsum, matte, or soda slag. It also eliminates disposal of waste water containing high concentrations of dissolved solids, and recovers substantially all of the sulfur as a high quality product.

In the process of the invention, spent lead acid batteries are crushed. The acid from the batteries is separated and may be fed to the heavy metal removal step described below. Plastic is removed from the crushed battery.

The lead bearing materials are then fed to a reverberatory furnace. In the furnace, the lead bearing materials are smelted in an oxidizing atmosphere. As a result, the sulfur present in the feed to the furnace is volatized to $SO_2$. Lead is recovered from the reverberatory furnace.

The off gas stream from the furnace, which includes the volatile $SO_2$, is passed to a scrubber. The gasses are filtered in a dust collector prior to reaching the scrubber. Optionally, the collected dust may be returned to the furnace for further processing. Soluble alkaline materials are fed into the scrubber to convert the $SO_2$ to a soluble sulfite. Examples of suitable alkaline materials include NaOH, $Na_2CO_3$, KOH, ammonia carbonate, bicarbonate or hydride or any other materials which will produce a soluble sulfite solution.

The scrubber liquor containing the scrubbed material is oxidized, preferably by vigorously agitating the liquor while introducing air. This process oxidizes any sulfite species to sulfates.

After oxidation the sulfate solution is cleaned of heavy metals by a pH adjustment and co-precipitation with iron, sulfides and other materials. In this process the pH of the sulfate solution is reduced preferably by the addition of the separated, filtered acid recovered in the battery crushing stage. The pH of the sulfate solution is raised in various stages with alkali material and other materials to precipitate heavy metals and produce a clean sulfate solution which also contains chlorides. The heavy metal sludge may be returned to the furnace for recovery of the metals.

The filtered sulfate solution is sent to a crystallizer where the water is evaporated and, depending upon the alkaline material used to solubilize the $SO_2$, pure anhydrous crystals of $Na_2SO_4$, $K_2SO_4$, etc. are produced. The condensed water in the crystallizer may be used to wash the crystals to produce low chloride content product. The bulk of the condensed water may be returned as make up water for the scrubber.

The chlorides which are more soluble build up in the recirculating crystallizer solution. To prevent excessive buildup of chlorides and to eliminate them from the crystallizer, a bleed stream may be taken from the crystallizer. This liquid is saturated with sulfate and is near the boiling point. This liquid can be sent to an additional crystallization stage to produce a mixed sulfate chloride product.

To recover more of the solution as the pure sulfate product, the bleed liquid may be sent to a chiller crystallizer where the temperature of the liquid is reduced from about 100° C. to 1–5° C. The reduction in temperature reduces the solubility of the sulfate. In the chiller the low temperature crystallization of the sulfate yields a hydrated salt instead of the anhydrous sulfate produced in the high temperature crystallization process. The hydrated sulfate salts are separated from the solution and redissolved in the hot crystallizer solution.

The chlorides are concentrated by the process and are recovered producing a dry, mixed sulfate-chloride salt product via an evaporator such as a spray dryer. The volume of the liquid sent to the spray dryer is reduced by the waters of hydration removed from the crystallizer bleed stream in the chiller crystallizer.

EXAMPLE

One hundred (100) tons of lead acid batteries contain about 54 tons of lead and lead alloy materials, 2.5 tons of sulfur in the paste or active material and 1.4 tons of sulfur as $H_2SO_4$ in the battery electrolyte.

In the present process the sulfur lost to the process in the $SO_2$ emissions from the scrubber is 0.012 tons or 0.3% of the total input sulfur. The slag from the process will trap 0.105 tons, or 2.7% of the input sulfur. The two crystallizers will recover 3.78 tons or 97% of the input sulfur as products from the scrubber and the neutralized acid. The amount of the mixed sulfate-chloride product depends on the amount of chloride input to the system and is estimated to be 0.2 tons in this example.

Thus, the process will recover and trap 99.7% of the contained sulfur in the battery or virtually all the sulfur in the battery.

FIG. 1 depicts the flow sheet as a block diagram which shows the various steps. In the process, spent batteries are crushed[1] and the acid[2] is recovered for later use. The crushed batteries are fed to heavy media sink/float systems[3] where the recyclable polypropylene case material[4] is separated and the lead bearing materials[5] including other polymeric materials are prepared for the furnace.

In the furnace[6] the lead bearing materials are reduced to metallic lead[7]. The off gases[8] from the furnace contain substantial amounts of $SO_2$, volatile dusts, and chlorides.

The SO$_2$ is generated by the following reaction: PbSO$_4$+ C→Pb+SO$_2$+CO$_2$.

The gases are cooled and the dust is removed in a cloth filter baghouse[9]. The dust is transferred back to the furnace. The gases leaving the dust filter enter a scrubber[10] where the SO$_2$, chlorides, and any carryover dust from the bag filter are removed from the gas stream by contact with a NaOH or Na$_2$CO$_3$ based alkaline solution. The cleaned gases then exit the plant via a stack[11].

The scrubber solution[12] is oxidized to Na$_2$SO$_4$ in a series of oxidation tanks[13] using air sparged into the scrubber solution at high pressure. The air oxidizes Na$_2$SO$_3$ and other sulfur containing compounds to Na$_2$SO$_4$. After the oxidation is complete, the Na$_2$SO$_4$ solution[14] is transferred to a heavy metals removal system[15]. In this system, the pH of the solution is decreased with the H$_2$SO$_4$ recovered from the battery crushing operation. Fe$_2$(SO$_4$)$_3$ is added as a co-precipitant and the pH is raised in a series of stages to precipitate the heavy metals.

The treated solution is filtered[16] and the heavy metal sludge[17] is returned to the furnace. The clean Na$_2$SO$_4$ solution[18] is sent to a crystallizer[19], where the water is evaporated and condensed as high purity condensate[20], and the Na$_2$SO$_4$ recovered as high purity crystals[21]. The condensate can be discharged, used as wash water, or used as makeup water for the scrubber.

The crystallizer recirculating solution contains chlorides which will continue to build up to considerable levels if not removed from the system. A bleed stream[22] is removed from the crystallizer and sent to a chiller crystallize[23] where the temperature is reduced causing the Na$_2$SO$_4$ in the solution to precipitate as Na$_2$SO$_4$·10H$_2$O[24] which is returned to the crystallizer.

The discharge from the chiller crystallizer is sent to a third crystallizer such as a spray dryer[25] where a mixed salt product[26] is obtained. The mixed salt contains NaCl, Na$_2$SO$_4$, CaCl$_2$, MgCl, and other salts soluble in the scrubber not removed in the heavy metal cleaning process.

What is claimed is:

1. A process for recycling spent lead acid batteries into non-hazardous materials comprising:

a. separating the plastic and acid from the lead-bearing materials in a crushed lead acid battery;

b. volatilizing the sulfur present in the battery to SO$_2$ by smelting the lead bearing materials which remain after said separation in an oxidizing atmosphere in a smelting furnace;

c. scrubbing the SO$_2$ from the off gas stream of the smelting furnace in an alkali scrubber to produce a soluble sulfite solution;

d. treating the solution by oxidation to convert the soluble sulfite to a sulfate;

e. removing any remaining heavy metals from the solution;

f. crystallizing sulfur present in the solution resulting from the foregoing steps in a primary crystallizer as high purity alkali sulfate crystals, and, g. when chloride species are present, removing a portion of the solution remaining after step f to a second crystallizer to recover soluble sulfate and chloride species present in said solution as a mixed salt product.

2. The process of claim 1 in which a portion of the solution resulting after step f is sent to a chiller crystallizer where alkali sulfate is removed as a hydrated sulfate and returned to the primary crystallizer.

3. The process of claim 1 in which the furnace is a reverberatory furnace.

4. The process of claim 1 in which the furnace is a rotary furnace.

5. The process of claim 1 in which the furnace is an electric furnace.

6. The process of claim 1 in which SO$_2$ is scrubbed using Na$_2$CO$_3$.

7. The process of claim 1 in which SO$_2$ is scrubbed using NaOH.

8. The process of claim 1 in which SO$_2$ is scrubbed using a potassium compound.

9. The process of claim 1 in which the soluble sulfate and chloride species are crystallized by spray drying.

* * * * *